United States Patent
Mele

(10) Patent No.: US 6,517,215 B2
(45) Date of Patent: Feb. 11, 2003

(54) FLASHLIGHT WITH OFF SET LIGHT SOURCE

(75) Inventor: Scott A. Mele, Trenton, NJ (US)

(73) Assignee: Tektite Industries Inc., Trenton, NJ (US)

( * ) Notice: Subject to any disclaimer, the term of this patent is extended or adjusted under 35 U.S.C. 154(b) by 0 days.

(21) Appl. No.: 09/761,483

(22) Filed: Jan. 18, 2001

(65) Prior Publication Data

US 2002/0093818 A1 Jul. 18, 2002

(51) Int. Cl.$^7$ ................................................ F21L 4/04
(52) U.S. Cl. ...................................... 362/203; 362/800
(58) Field of Search ................................ 362/396, 202, 362/203, 208, 800, 205

(56) References Cited

U.S. PATENT DOCUMENTS

| | | | | |
|---|---|---|---|---|
| 5,510,963 A | * | 4/1996 | Bamber et al. | 362/190 |
| 5,904,414 A | * | 5/1999 | Monteleone et al. | 362/203 |
| 5,911,497 A | | 6/1999 | Mele | 362/202 |
| 6,168,288 B1 | * | 1/2001 | St. Claire | 362/208 |
| 6,290,370 B1 | * | 9/2001 | Bouffay et al. | 362/203 |

FOREIGN PATENT DOCUMENTS

CA 645021 * 7/1962 ................. 362/203

* cited by examiner

Primary Examiner—Y. My Quach-Lee
Assistant Examiner—Peggy A Neils
(74) Attorney, Agent, or Firm—Donald S. Cohen; Joseph F. Posirieo

(57) ABSTRACT

A flashlight has a housing having a battery containing portion with a closed back end and an open front end, and a light source containing portion integral with and extending from the front open end of the battery containing portion. The battery containing portion is substantially triangular in transverse cross-section with rounded corners which form three battery containing chambers within the battery containing portion. Three spiral springs are in the battery containing portion and are seated on the closed end of the battery containing portion with each spring being in alignment with a battery chamber. Two of the springs are electrically connected together the third spring has an electrode wire extending along one side of the battery containing portion to the light source containing portion. The light source containing portion is cylindrical and has its longitudinal axis in alignment with one of the battery chambers in the battery containing portion. A light generating means, such as a LED, is mounted in the light source containing portion and has a pair of terminals which are adapted to be connected across the batteries in the battery containing portion. A cup shaped cap is threaded on the light source containing portion and is adapted to move the light generating means into and out of an electrical connected with the batters to turn the flashlight on and off.

12 Claims, 2 Drawing Sheets

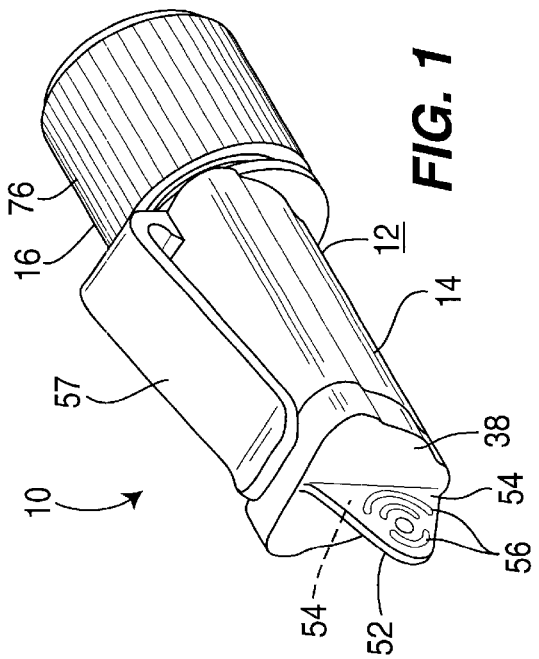
FIG. 1
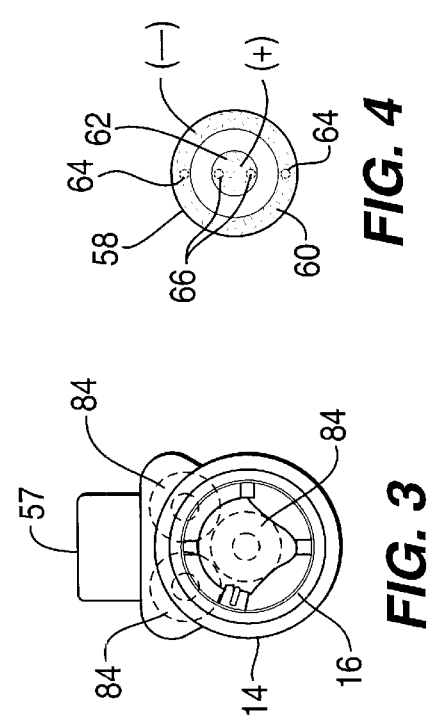
FIG. 3
FIG. 4
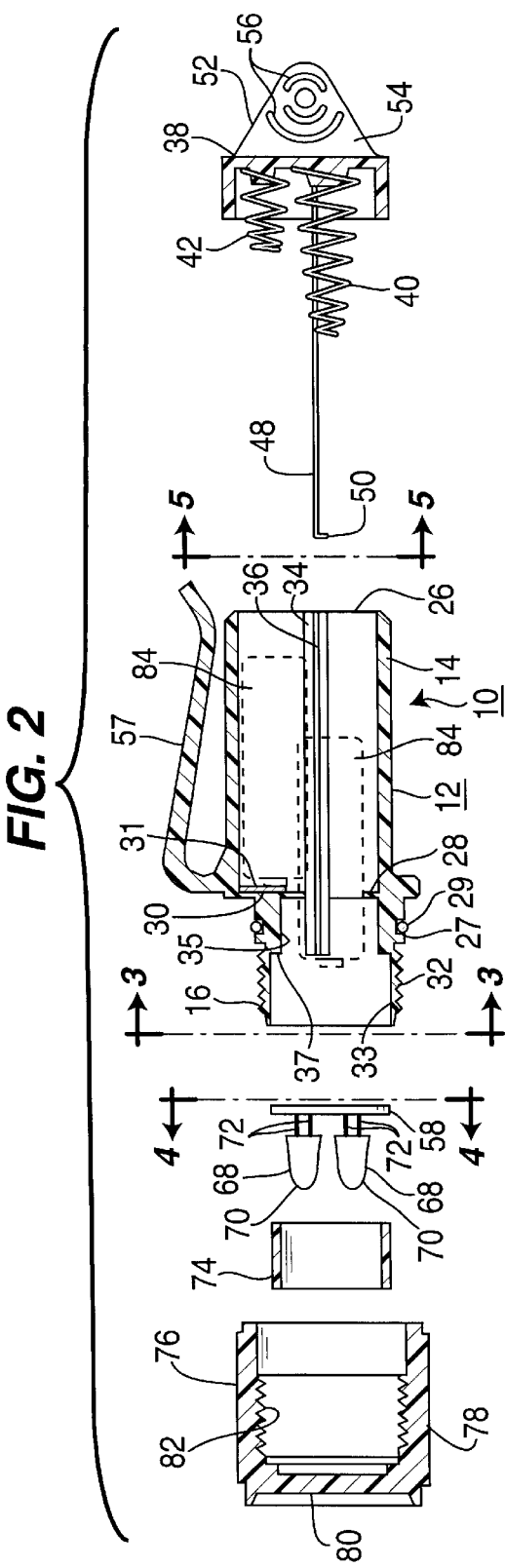
FIG. 2

FLASHLIGHT WITH OFF SET LIGHT SOURCE

FIELD OF THE INVENTION

The present invention relates to a miniature high power flashlight, and, more particularly, to a flashlight which is small in size and still produces a relatively high intensity of light.

BACKGROUND OF THE INVENTION

Most flashlights comprise a cylindrical housing containing one or more batteries therein, a cap on one end of the housing containing a light source, such as a bulb or light emitting diode, a reflector and a lens cover over the light source. The light source is electrically connected in series with the batteries so that it can be turned on and off. Generally, some type of switch is provided to turn the light source on and off. To achieve more power ad a stronger light, the flashlight is generally provided with two or more batteries in series and/or larger size batteries. The larger the number of batteries used to obtain an increase in power, the larger the housing that is required.

In U.S. Pat. No. 5,911,497 to Scott A. Mele, issued Jun. 15, 1999 and entitled MULTI-BATTERY FLASHLIGHT, there is shown and disclosed a flashlight in which the batteries are mounted in side-by-side relation rather than in end-to-end relation. Although this provides a multi-battery flashlight for achieving a higher power of light and a shorter housing, the body of the flashlight is relatively larger in circumference. Therefore, it would be desirable to have a high power flashlight which is short in length and also relatively small in circumference.

SUMMARY OF THE INVENTION

A flashlight which includes a housing having a battery containing portion and a light source containing portion. The battery containing portion is substantially triangular in transverse cross-section with rounded corners forming within the battery containing portion a battery chamber at each of the corners. The battery containing portion has a closed back end and an open front end. The light source containing portion is cylindrical and is integral with and extends from the open end of the battery containing portion. The axis of the light source containing portion is in alignment with one of the battery chambers in the battery containing portion. The battery containing portion is adapted to contain three batteries, one in each battery chamber, and the light source containing oration is adapted to contain means for generating light when connected in series with the batteries. A cap is threaded on the light source containing portion and is adapted to turn on the light generating means for generating light when connected in series with the batteries. A cap is threaded on the light source containing portion and is adapted to run on the light generating means when threaded onto the light source containing portion and turn off the light generating means when threaded in the opposite direction so as to turn the flashlight on and off.

BRIEF DESCRIPTION OF THE DRAWINGS

FIG. 1 is a perspective view of the flashlight of the present invention.

FIG. 2 is an exploded sectional view of the flashlight;

FIG. 3 is a view of the flashlight taken along line 3—3 of FIG. 2;

FIG. 4 is a view of the flashlight taken along line 4—4 of FIG. 2;

DETAILED DESCRIPTION OF PREFERRED EMBODIMENT

Figure 5:
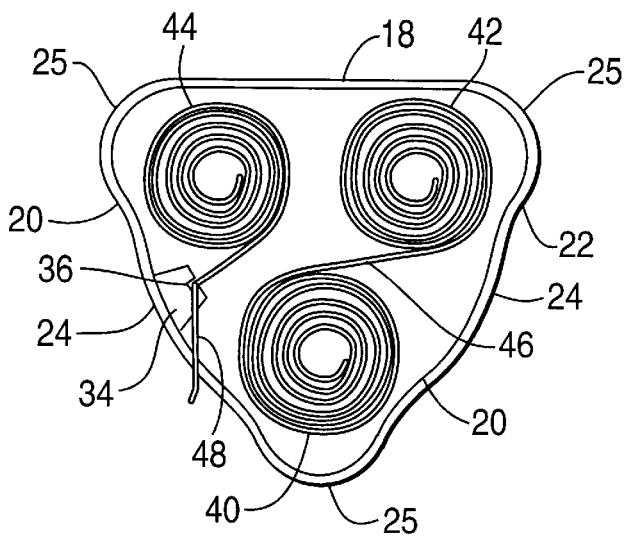
FIG. 5 is a view of the flashlight taken along line 5—5 of FIG. 2.

Referring initially to FIGS. 1 and 2, the flashlight of the present invention is generally designated as 10. Flashlight 10 comprises a housing 12 of an insulating material, such as a plastic. Housing 12 comprises a battery containing portion 14 and a light source containing portion 16. The battery containing portion 14 is substantially triangular in transverse cross-section (see FIG. 5), having a first flat side 18 and second and third sides 20 and 22. Each of the second and third sides 20 and 22 has an outwardly extending bulge 24 therein. The corners 25 between the sides 18, 20 and 22 are rounded. This forms the battery containing portion 14 with three parallel, side-by-side and substantially tangent battery containing chambers therein, one along each of the rounded corners 25. The battery containing portion 14 has aback end 26 and a front end 28.

The light source containing portion 16 is cylindrical and is integral with and extends from the front end 28 of the battery containing portion 14. The light source containing portion 16 is smaller in transverse circumference than that of the battery containing portion 14. The light source containing portion 16 is positioned so that it is offset from the first flat side 18 of the battery containing portion 14 and so that its longitudinal axis is in alignment with the longitudinal axis of the battery containing chamber formed in the corner 25 between the second and third sides 20 and 22 of the battery containing portion 14. The offset position of the light source containing portion 16 provides a flat surface 30 which is inside the housing 12 and extends between the first flat side 18 of the battery containing portion 14 and the light source containing portion 16. A strip 31 of an electrically conductive metal, such as copper, is mounted on and secured to the flat surface 30. The outer surface of the light source containing portion 16 has a helical thread 12 therein, and behind the thread 32 is an annular groove 27 containing an O-ring 29. The inner surface of the light source containing portion has a portion 33 at its front end which is larger in diameter than the diameter of its portion 35 adjacent its back end. This provides a radially extending shoulder 37 between the two portions 33 and 35.

As shown in FIGS. 2 and 5–7, a ridge 34 projects inwardly from the second side 20 of the battery containing portion 14 at the bulge 24. The ridge 34 extends longitudinally along the entire side 20 and into the light source containing portion 16. A slot 36 is in the ridge 34 and extends along the entire lengthy of the ridge 34.

A cup shaped bottom cover 38 is secured to the back end 26 of the housing 12. Three conical spiral springs 40, 42 and 44 are secured in the bottom cover 38 with the larger ends of the springs 40, 42 and 44 being seated on and secured to the bottom of the bottom cover 38. Each of the springs 40, 42 and 44 is positioned in alignment with a battery compartment of the housing 12. The spring 40 which is in alignment with the battery compartment which is in alignment with the light source containing portion is longer than the other two springs 42 and 44. As shown in FIG. 5, the springs 40 and 42 are connected at their bottom ends by an integral connecting portion 46. The spring 44 has an elongated electrode wire 48 integral with and extending from the bottom end thereof. The electrode wire 48 fits in and extends along the slot 36 in the ridge 34. The wire 48 is long enough to extends beyond the ridge 34 into the light source containing portion 16 and has a tab 50 on the end thereof. A relatively thin, triangular shaped tab 52 projects from the outer surface of the bottom cover 38. The tab 52 has opposed flat surfaced 54 and semi-circular ridges 56 project from the flat surfaces 54. An elongated leaf spring 57 has one end secured to the outer surface of the flat first side 18 of the housing adjacent the front end 28 thereof. The leaf spring 57 extends along the flat first side 18 toward the back end 26 of the housing with the free end of the leaf spring 57 being closer to the flat first side 18 than the connected end of the leaf spring 57.

The light source containing portion 16 contains a light source, which, as shown, is a light emitting diode assembly. The light emitting diode assembly is similar in structure to that shown and described in U.S. Pat. No. 6,168,288 Issued Jan. 2, 2001 to Christian P. St. Claire, entitled FLASHLIGHT WITH LIGHT EMITTING DIODES. The light emitting diode assembly comprises a flat, circular mounting plate 58 of an insulating material, such as a plastic. The mounting plate 58 has an outer diameter substantially equal to the diameter of the larger diameter portion 33 of the light source containing portion 16 of the housing 12. As shown in FIG. 4, on the back surface of the mounting plate 58 is an annular strip 60 of a conductive material, such as a metal, which extends around the circumference of the mounting plate 58. A circular area 62 of a conductive material is on the back surface of the mounting plate 58 within and spaced from the annular strip 60. A pair of spaced holes 64 extend through the mounting plate 58 to the annular strip 60, and a second pair of spaced holes 66 extend through the mounting plate 58 to the circular area 62.

Light emitting diodes (LEDs) 68 are mounted on the mounting plate 58. Although there is shown two LEDs 68 mounted on the mounting plate 58, any desired number of the LEDs can be used. Each of the LEDs 68 includes a casing 70 of a light transparent material. such as a glass, having therein a light emitting semiconductor diode, not shown. A pair of terminals 172 project from the casing 70 of each of the LEDs 68. Within the casing 70, the terminals 172 are connected to opposite sides of the semiconductor light emitting diode. One terminal 72 of each LED 68 extends through a hole 64 in the mounting plate 58 and the other terminal 72 extends through a hole 66. The terminals 172 are mechanically connected to the plate 58 and electrically connected to the annular strip 60 or the center area 62 by a suitable solder, not shown. Although any suitable LED which emits light at the desired wave length can be used, a suitable LED is one that emits white light, such as the Nichia 5 mm white LED sold by the Nichia American Corporation of Lancaster, Pa. The mounting plate 58 with the LEDs 68 thereon is mounted in the larger diameter portion 33 of the light source containing portion 16 with the LEDs 68 facing outwardly.

A cylindrical spacer ring 74 of a plastic material is within the larger diameter portion 33 of the light source portion 16. The outer diameter of the spacer ring 74 is substantially the same as the diameter of the larger diameter portion 33 of the light source containing portion 16. The inner diameter of the spacer ring 74 is such that it is spaced from the LEDs 68. The spacer ring 74 is of a length that it extends from the mounting plate 58 beyond the open end of the light source containing portion 16 of the housing 12. A cup shaped cap 76 is mounted on the open end of the light source containing portion 16 of the housing 12. The cap 76 has a cylindrical wall 78 and an end wall 80. The cylindrical wall 78 of the cup 76 has an inner diameter substantially the same as the outer diameter of the light source containing portion 16, and has a thread 82 in its inner surface. Thus, the cap 76 can be threaded onto the end of the light source containing portion 16 with the end wall 80 extending across the open end of the light source containing portion 16. At least the end wall 80 of the cap 76 is of a light transparent material to allow the light from the LEDs to pass therethrough.

To operate the flashlight 10, three small batteries 84, preferably AAA size batteries, are inserted into the battery containing portion 14 of the housing 12 through the light source containing portion 16. Each of the batteries 84 is positioned in a chamber formed by a separate corner 25. The first two batteries 84 which are inserted into the housing 12 are positioned in the corners 25 adjacent the flat first side 18 of the battery containing portion 14. Each of these batteries 84 is placed between one of the short springs 40 and 42 and the metal strip 31 so that one electrode of each battery contacts a spring 40 or 42 and the other electrode contacts the metal strip 31. The springs 40 and 42 hold these batteries 84 against the metal strip 31. The third battery 84 is placed in the chamber at the other corner 25 and is seated on the longer spring 44.

Figure 6:
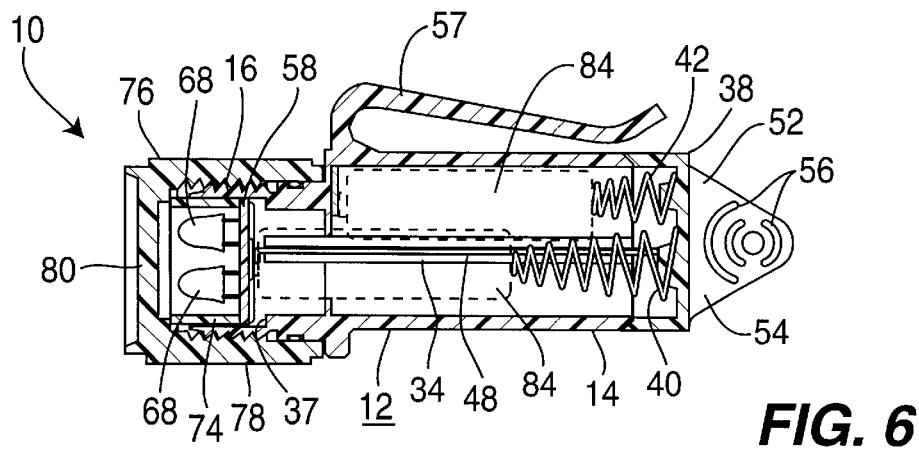
FIG. 6 is a sectional view of the flashlight with the parts being arranged in the light turn-on position.
Figure 7:
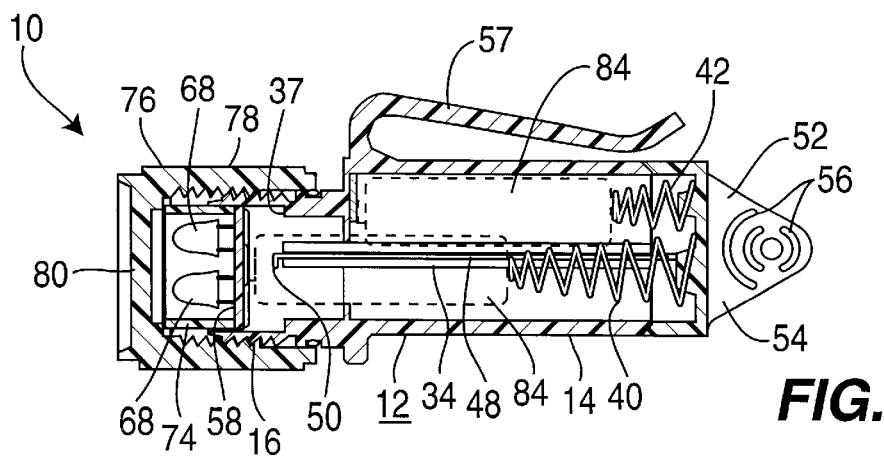
FIG. 7 is a sectional view of the flashlight with the parts being arranged in the light turn-off position.

The plate 58 with the LEDs 68 thereon is then placed into the light source containing portion 16 with the LEDs facing toward the open end of the light source containing portion 16. The plate is moved back into the light source containing portion 16 until the electrode of the third battery contacts the center metal area 62 on the back surface of the plate 58. The spacer ring 74 is inserted into the light source containing portion 16 around the LEDs until it contacts the front surface of the plate 58. The cap 76 is then threaded onto the light source containing portion 16 until it contacts the end of the spacer ring 74. When the cap 76 is threaded fully onto the light source containing portion 16 as shown in FIG. 6, the cap 76 presses the spacer ring 74 against the plate 58 and pushes the plate 58 against the third battery 84 and the longer spring 44 until the tab 50 on the end of the contact wire 48 engages the annular metal strip 60 on the back surface of the plate 5a8. This completes the circuit between the batteries 84 and the LEDs 68 so as to turn the LEDs on and emit light from the flashlight 12 through the end wall 80 of the cap 76. By threading the cap 76 slightly in the opposite direction, the pressure of the long spring 44 through the third battery 84 presses the plate 58 away from the tab 50 on the end of the electrode wire 48. This breaks the electrical circuit between the batteries 84 and the LEDs 68 so as to turn the LEDs off. Thus, the cap 76 serves as a switch to turn the flashlight 12 on and off. When the cap is threaded onto the housing 12, it engages the O-ring 29 so as to provide a gas tight seal for the interior of the housing 12.

Thus there is provided by the present invention a flashlight which is relatively small in size and has multiple number of batteries so as to provide a relatively high power of light. The flashlight of the present invention can be as small as about 4 inches in length and 1 inch in diameter. Also the flashlight provides means for easily holding the flashlight. The flashlight 10 may be mounted on the brim of a hat by inserting the brim between the clip arm and the flat side 18 of the housing 12 so that it can direct a beam of light in front of the user without being held. The flashlight 10 can also be held in the mouth of the user by clamping the tab 52 between user's teeth. The ridges 56 on the flat sides 54 of the tab 52 will prevent the flashlight from moving about between the teeth of the user. This provides another way of providing a beam of light in front of the user while leaving the hands of the user free.

What is claimed is:

1. A flashlight comprising:
   a) a battery containing portion having a front end, a substantially closed back end, and a substantially triangular transverse cross sectional configuration including at least one corner forming within the battery containing portion a battery chamber;
   b) a substantially cylindrical light source containing portion being in alignment with said battery chamber in the battery containing portion and extending from the front end of the battery containing portion, said light source containing portion having a transverse cross-sectional dimension which is smaller than that of the substantially triangular transverse cross-sectional configuration of the battery containing portion and is off set from one side of the battery containing portion so as to form a transverse surface at the front end of the battery containing portion which extends from said one side of the battery containing portion to the light source containing portion, said light source containing portion being adapted to contain means for generating light when connected across a battery contained in said battery chamber; and
   c) a cap threaded onto the end of the light source containing portion, said cap when thread onto the light source containing portion being adapted to move the light generating means into an electrical circuit with the batteries so as to turn on the light generating means and when threaded in the opposite direction to allow the light generating means to disconnect from the batteries to turn off the light generating means and thereby turn the flashlight on and off.

2. The flashlight in accordance with claim 1 further comprising an electrically conductive strip extending across and secured to said transverse surface.

3. The flashlight in accordance with claim 1 wherein said battery containing portion has at least three corners and each corner comprises a battery chamber capable of containing a separate battery, each of said chambers having a spiral spring seated on the closed back end of the battery containing portion and in which the spring for one of said chambers is longer than the other two springs and is in alignment with the longitudinal axis of the light source containing portion such that one of said separate batteries is adapted to be seated on the longer spring with an electrode of the one of said batteries contacting the longer spring.

4. The flashlight in accordance with claim 3 in which the longer spring is electrically connected to one of the shorter springs and the other shorter spring has an electrode wire extending therefrom along a side of the battery containing portion and into the light source containing portion and a tab on its free end.

5. The flashlight in accordance with claim 4 further comprising a ridge projecting inwardly from and extending along the side of the battering containing portion along which the electrode wire extends, said ridge having a groove therein extending longitudinally there along, and the electrode wire is in the groove and projects from the end of the groove into the light source containing portion.

6. The flashlight in accordance with claim 1 in which the light source means comprises at least one light emitting diode (LED) mounted in the light source containing portion, said LED having a pair of terminals which are adapted to be connected across said batteries when the cap is threaded on to the light source containing portion to turn the flashlight on.

7. The flashlight in accordance with claim 6 in which the light source means further comprises a flat circular plate of an insulating material having a pair of spaced metal areas on its back surface, the LED is mounted on the front surface of the plate with each of the terminals of the LED being electrically connected to a separate one of the metal areas, said plate being mounted in the light source containing portion of the housing so that the plate can be moved to bring its metal areas into contact with the tab of the electrode wire and the third battery to turn on the LED.

8. The flashlight in accordance with claim 7 in which one of the metal areas on the plate is annular and extends around the periphery of the plate and the other area is circular and is in the center of the back surface of the plate and is spaced from the annular area.

9. The flashlight in accordance with claim 8 further comprising a cylindrical spacer ring of an insulating material in the light source containing portion and extending around the LED, the spacer ring adapted to be engaged by the cap when the cap is threaded onto the light source containing portion.

10. The flashlight in accordance with claim 9 which the cap has a cylindrical portion which is internally threaded and an end wall formed of a light transparent material.

11. The flashlight of claim 1 further comprising further comprising three spiral springs in the battery containing portion and seated on the closed back end of the battery containing portion, each of said springs adapted to press against a separate battery and contact an electrode of said respective battery.

12. The flashlight of claim 11 further comprising an electrically conductive strip extending across and secured to said transverse surface wherein two of said battery chambers are adapted to each contain at least one battery between its respective spring and the electrically conductive strip, and the third battery chamber is adapted to contain at least one battery between its spring and the light source containing portion.

* * * * *